(12) United States Patent
Major et al.

(10) Patent No.: US 8,683,013 B2
(45) Date of Patent: Mar. 25, 2014

(54) SYSTEM AND METHOD FOR DATA STREAMING IN A COMPUTER NETWORK

(75) Inventors: Robert D. Major, Orem, UT (US); David R. Oran, Acton, MA (US); Ashok Narayanan, Lexington, MA (US); Francois L. Le Faucheur, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 119 days.

(21) Appl. No.: 13/088,927

(22) Filed: Apr. 18, 2011

(65) Prior Publication Data

US 2012/0265856 A1    Oct. 18, 2012

(51) Int. Cl.
*G06F 15/16* (2006.01)

(52) U.S. Cl.
USPC ............................. 709/219; 709/231; 375/377

(58) Field of Classification Search
USPC ........... 709/219, 227, 231, 246; 375/377, 240
See application file for complete search history.

(56) References Cited

U.S. PATENT DOCUMENTS

| | | | |
|---|---|---|---|
| 6,345,307 B1 | 2/2002 | Booth | |
| 6,493,386 B1 | 12/2002 | Vetro et al. | |
| 6,542,546 B1 | 4/2003 | Vetro et al. | |
| 8,301,982 B2 | 10/2012 | Ver Steeg et al. | |
| 2001/0047517 A1* | 11/2001 | Christopoulos et al. | 725/87 |
| 2003/0030752 A1 | 2/2003 | Begeja et al. | |
| 2003/0236904 A1 | 12/2003 | Walpole | |
| 2005/0055712 A1 | 3/2005 | Whyte et al. | |
| 2007/0022185 A1 | 1/2007 | Hamilton et al. | |
| 2007/0033623 A1 | 2/2007 | Fredrickson et al. | |
| 2007/0280232 A1 | 12/2007 | Dec et al. | |
| 2011/0072148 A1 | 3/2011 | Begen et al. | |
| 2011/0082924 A1 | 4/2011 | Gopalakrishnan | |
| 2011/0138020 A1 | 6/2011 | Pantos et al. | |
| 2011/0289538 A1 | 11/2011 | Begen et al. | |
| 2012/0254456 A1* | 10/2012 | Visharam et al. | 709/231 |

FOREIGN PATENT DOCUMENTS

| | | |
|---|---|---|
| EP | 1622385 | 2/2005 |
| WO | WO2006/004472 | 1/2006 |
| WO | WO2011/015243 | 2/2011 |
| WO | WO2012/145108 | 10/2012 |
| WO | WO2013/116554 | 8/2013 |

OTHER PUBLICATIONS

Adobe Systems Incorporated, "Flexible delivery of on-demand and live video streaming," © 2011, 3 pages, http://www.adobe.com/products/httpdynamicstreaming/.

Pantos, R., "HTTP Live Streaming," Informational Internet Draft, Nov. 19, 2010, 23 pages, http://tools.ietf.org/html/draft-pantos-http-live-streaming-05.

(Continued)

*Primary Examiner* — El Hadji Sall
(74) *Attorney, Agent, or Firm* — Patent Capital Group

(57) ABSTRACT

A method is provided in one embodiment and includes establishing a video session involving an endpoint and a server; evaluating network criteria associated with characteristics that can affect a bit rate for the video session; and communicating bit rate hint data, which is based on the network criteria, to the endpoint for consideration in a bit rate request. The bit rate request involves streaming data in the video session. The method also includes receiving the bit rate request from the endpoint.

23 Claims, 4 Drawing Sheets

(56) References Cited

OTHER PUBLICATIONS

U.S. Appl. No. 13/363,933, filed Feb. 1, 2012 entitled "System and Method to Reduce Stream Start-Up Delay for Adaptive ," Inventors: David R. Oran, et al.

U.S. Appl. No. 13/348,094, filed Jan. 11, 2012 entitled "System and Method for Obfuscating Start-Up Delay in a Linear Media Service Environment," Inventors: Scott C. Labrozzi, et al.

U.S. Appl. No. 13/679,413, filed Nov. 16, 2012, entitled "System and Method for Providing Alignment of Multiple Transcoders for Adaptive Bitrate Streaming in a Network Environment," Inventors: Gary K. Shaffer, et al.

U.S. Appl. No. 13/873,589, filed Apr. 30, 2013, entitled "Managing Bandwidth Allocation Among Flows Through Assignment of Drop Priority," Inventor(s): Joshua B. Gahm, et al.

U.S. Appl. No. 13/869,811, filed Apr. 24, 2013, entitled "Size Prediction in Streaming Environments," Inventors: Matthew Francis Caulfield, et al.

USPTO Sep. 9, 2013 Non-Final Office Action from U.S. Appl. No. 13/348,094.

PCT Jun. 3, 2013 International Search Report and Written Opinion from International Application Serial No. PCT/US2013/024197 10 pages.

PCT—Jun. 14, 2012 International Search Report and Written Opinion from International Application Serial No. PCT/US2012/029691 10 pages.

Cisco Press Release, "Cisco and Service Providers Aim to Reinvent the TV Experience with Videoscape," Cisco Systems, Jan. 5, 2011, Las Vegas, NV http://newsroom.cisco.com/press-release-content?type=webcontent&articleId=5856789.

Cisco Systems, "Videoscape Unity: The Future of Television," 2 pages [Retrieved and printed Oct. 2, 2013] http://www.cisco.com/en/US/netsol/ns1043/networking_solutions_market_segment_solution.html.

Ibanez, J., et al., "Preliminary Simulation Evaluation of an Assured Service," IETF Internet Draft, <draft-ibanez-diffserv-assured-eval-oo.txt>, Aug. 1998, 20 pages http://tools.ietf.org/html/draft-ibanez-diffserv-assured-eval-00.

ISO/IEC 13818-1 International Standard, "Information Technology—Generic Coding of Moving Pictures and Associated Audio Information: Systems," Dec. 1, 2000, © ISO/IEC 2000; printed in Switzerland; 174 pages.

MPEG Transport Stream from Wikipedia, the free encyclopedia; 7 pages [Retrieved and printed Sep. 6, 2012] http://en.wikipedia.org/wiki/MPEG_transport_stream.

MPEG-2 from Wikipedia, the free encyclopedia; 32 pages [Retrieved and printed Sep. 6, 2012] http://en.wikipedia.org/wiki/MPEG-2.

Neglia, Giovanni, et al., "An Analytical Model of a new Packet Marking Algorithm for TCP Flows," Elsevier Science, Sep. 12, 2005, 28 pages http://www-sop.inria.fr/members/Giovanni.Neglia/publications/neglia06comnet.pdf.

Pantos, R., "HTTP Live Streaming," Informational Internet Draft, Sep. 30, 2011, 34 pages, http://tools.ietf.org/html/draft-pantos-http-live-streaming-07.

U.S. Appl. No. 14/051,234, filed Oct. 13, 2013, entitled "Virtual Assets for On-Demand Content Generation," Inventor(s) Mahesh Vittal Viveganandhan, et al.

PCT—Oct. 22, 2013 International Preliminary Report on Patentability from International Application Serial No. PCT/US2012/029691 10 pages.

* cited by examiner

US 8,683,013 B2

SYSTEM AND METHOD FOR DATA STREAMING IN A COMPUTER NETWORK

TECHNICAL FIELD

This disclosure relates in general to the field of communications and, more particularly, to data streaming in a computer network.

BACKGROUND

Video services have become increasingly important in today's society. In certain architectures, service providers may seek to offer high-quality streaming video services for their end users. Streaming video is an efficient method of distributing video data to a large number of users. However, many network issues can affect the quality of the data stream, where poor quality may result in packet loss, delays, and an overall sub-optimal viewing experience for clients. The ability to optimize the quality and consistency of streamed video presents a significant challenge to service providers, network operators, and clients alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one embodiment and includes establishing a video session involving an endpoint and a server; evaluating network criteria associated with characteristics that can affect a bit rate for the video session; and communicating bit rate hint data, which is based on the network criteria, to the endpoint for consideration in a bit rate request. The bit rate request involves streaming data in the video session. The method also includes receiving the bit rate request from the endpoint. In more specific implementations, the network criteria can include a number of requests for particular content upstream of the server; a utilization characteristic associated with the server; a bandwidth characteristic associated with network infrastructure upstream of the server; and load conditions associated with an origin server that provides content for the video session.

In particular embodiments, the bit rate hint data can be provided in headers of hypertext transfer protocol (HTTP) packets. Alternatively, the bit rate hint data is provided in a manifest associated with the video session. In specific examples, the server is a cache server coupled to an origin server that provides content for the video session. The cache server can provide a bit rate that is higher than a particular bit rate specified in the bit rate request based on the evaluation of the network criteria.

Example Embodiments

Figure 1:
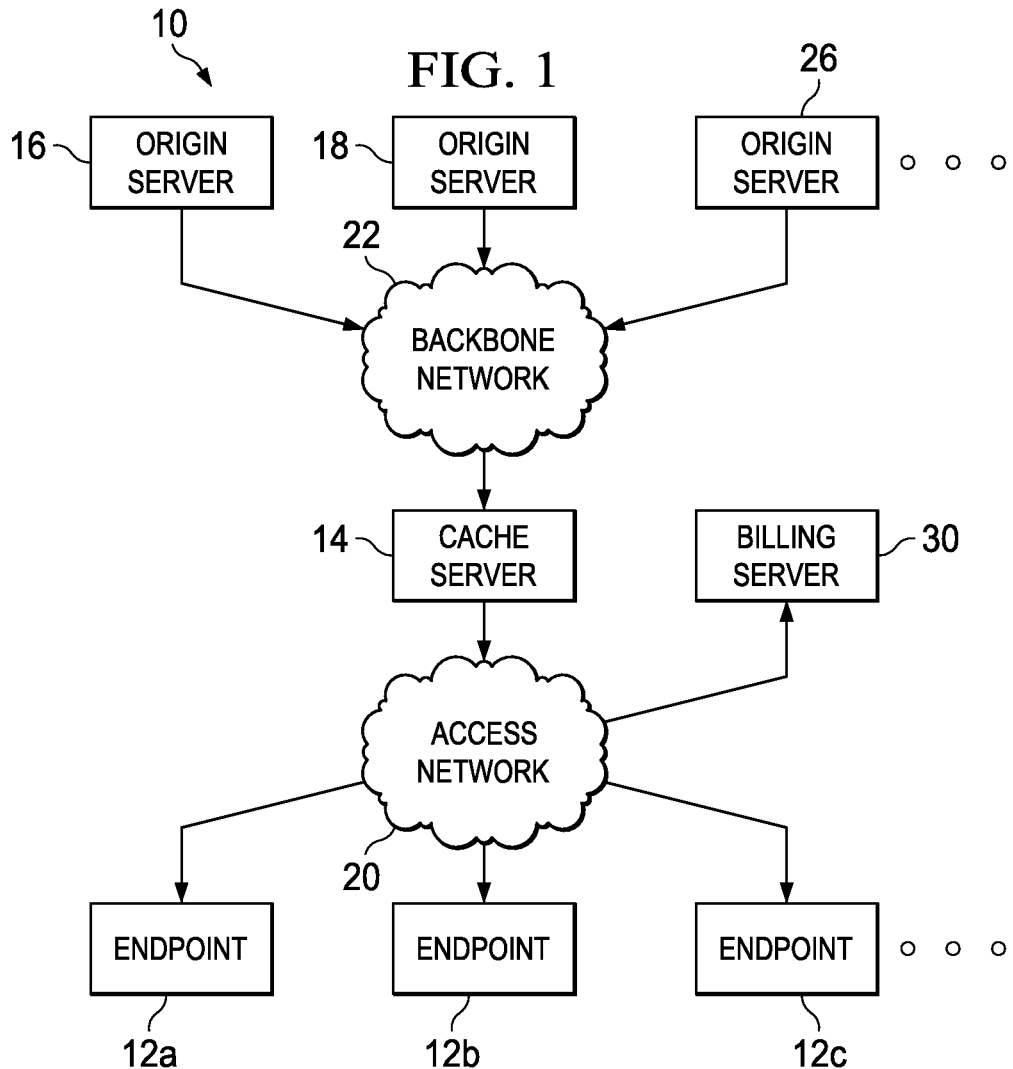
FIG. 1 is a simplified block diagram illustrating a communication system for data streaming in accordance with one embodiment of the present disclosure.

Turning to FIG. 1, FIG. 1 is a simplified block diagram illustrating a communication system 10 for streaming data in accordance with one embodiment of the present disclosure. In this particular example, FIG. 1 includes origin servers 16, 18, 26, which may be associated with any type of content sought to be accessed by any number of endpoints 12*a-c*. In this example of FIG. 1, endpoints 12*a-c* (also referred to as clients herein) represent the end-user devices (e.g., smartphones, tablets, computers, etc.) with which end users can view streamed video propagating through communication system 10.

FIG. 1 also includes a cache server 14 and a billing server 30: both of which can interface with the endpoints 12*a-c* via an access network 20. Cache server 14 can also interface with origin servers 16, 18, 26 via a backbone network 22. Note that the numerical and letter designations assigned to the endpoints and the origin servers do not connote any type of hierarchy; the designations are arbitrary and have been used for purposes of teaching only. These designations should not be construed in any way to limit their capabilities, functionalities, or applications in the potential environments that may benefit from the features of communication system 10.

In particular implementations, the components of communication system 10 may use specialized applications and hardware to create a system that can leverage a network. Communication system 10 can use Internet protocol (IP) technology and, further, can operate on an integrated voice, video, and data network. The system can also support high quality, real-time and/or prerecorded video streaming using broadband connections. It can further offer capabilities for ensuring quality of service (QoS), security, reliability, and high availability for high-bandwidth applications such as video.

In accordance with the teachings of the present disclosure, the data transfer technology of communication system 10 can be configured to adaptively stream an audio/video data stream to individual users who are resident at endpoints 12*a-c*. Logistically, communication system 10 can integrate cache server feedback to the rate adaptation algorithms (implemented by clients) in order to improve cache server behavior and reliability for video data propagating in the network. More specifically, this feedback mechanism can offer rate hints to clients in order to provide better video quality at lower network loads and at lower costs. Furthermore, the architecture of communication system 10 can eliminate unnecessary feedback, while engendering a more stable cache network.

Moreover, the mechanisms of communication system 10 improve the performance of cache server 14 by reducing cache miss rates, along with smoothing out the load on cache server 14. Separately, there is an incentive for clients to cooperate with the mechanisms of cache server 14 in selecting appropriate bit rates. Clients have an expectation that selected bit rates would be reliably delivered from the local cache, as opposed to using bit rates that may be inconsistent. Hence, communication system 10 allows data streams to propagate more efficiently by ensuring that each endpoint is receiving the highest quality data stream possible in light of a variety of network conditions (i.e., criteria), which can be systematically evaluated by cache server 14. Before detailing these criteria in the context of rate hint data being delivered to clients, it is important to understand the typical scenarios involving streaming video data that traverses the network at any given time.

Adaptive bit rate streaming (or adaptive streaming) is a technique used in streaming media over computer networks. Previously, most video streaming technologies utilized streaming protocols such real time streaming protocol (RTSP). Most of the current adaptive streaming technologies use hypertext transfer protocol (HTTP). Moreover, adaptive streaming technologies are designed to work efficiently over large distributed HTTP networks (e.g., the Internet). Current examples of this type of streaming include Adobe dynamic streaming, Apple HTTP adaptive streaming, Microsoft smooth streaming, Octoshape Multi-Bit rate, etc. Information describing the stream (including which video qualities and bit rates of the stream are available) is generally transferred in a separate file (e.g., in a manifest). Note that in typical data exchanges, the manifest file is conveyed to the endpoint separately from the actual media stream (i.e., it can be fetched by endpoint as a separate file).

Adaptive bit rate operates by detecting a user's bandwidth and CPU capacity (e.g., in real-time), and adjusting the quality of a video stream accordingly. The protocol can use an encoder, which can encode a single source video at multiple bit rates. The player client can switch between streams of the different encodings depending on available resources. The result (theoretically) allows fast start times, and an experience that is as good as achievable for both high-end and low-end connections. Note that these schemes actually rely on significant buffering on the client side. Also, while the experience is as good as possible on low-end connections, it is not as good as on high-end connection.

The media and entertainment industry are the main beneficiaries of adaptive bit rate streaming. As the video space grows exponentially, content delivery networks and video providers can provide customers with a superior viewing experience. Adaptive bit rate creates better performance. As media companies such as Hulu and Netflix have gained notoriety, their clients have come to expect high-quality video data. Theoretically, this can be achieved when adaptive bit rate streaming is used because the user's network and playback conditions are automatically being adapted at any given time under dynamic conditions.

With adaptive bit rate streaming, video data is generally divided into fragments or chunks, which are received at some prescribed rate. If the video chunks are arriving slowly, there is an inference that bandwidth may be limited. Conversely, if the video chunks are arriving quickly, there is an inference that there is sufficient bandwidth for this particular video stream (or possibly for a higher bit rate stream). Endpoints receiving the streaming video can respond to perceived network conditions by requesting more or less video data to be sent.

In the most general terms, bit rate is a measure of the rate of information content in a video stream. It is typically quantified using the bit per second (bit/s or bps) unit or Megabits per second (Mbit/s). A higher bit rate allows for better video quality. For example, VideoCD (having a bit rate of about 1 Mbit/s) is a lower-quality video than DVD, with a bit rate of about 5 Mbit/s. High Definition Digital Video and TV have a higher quality with a bit rate of about 20 Mbit/s.

Variable bit rate (VBR) is a strategy to maximize the visual video quality and minimize the bit rate. On fast motion scenes, a variable bit rate uses more bits than it does on slow motion scenes of similar duration, yet achieves a consistent visual quality. For real-time and non-buffered video streaming when the available bandwidth is fixed (e.g., in videoconferencing delivered on channels of fixed bandwidth), a constant bit rate (CBR) can be used.

In common network scenarios, video streams are sent from the sender (e.g., origin servers) to the destination. However, cache servers (e.g., cache server 14) can be provisioned (e.g. in the middle of the network) to perform certain activities that alleviate stress on the origin servers. Hence, a given endpoint could be systematically obtaining chunks of video data from a cache in contrast to receiving information directly from the point of origin. It should also be noted that the caches of the present disclosure are equally useful in non-ABR cases (e.g., those scenarios associated with progressive downloads).

One method of retrieving content from an origin server (content intended for a given endpoint) is to utilize a streaming protocol. The streaming data (e.g., media, video, and/or audio content) can be sent in a compressed form over a network (e.g., the Internet) and, subsequently, played almost immediately: rather than being saved at endpoint 12a. With streaming media, a user does would not have to wait to download a file in order to play requested content because the media would be sent in a continuous stream of data that can be played as it arrives. Users can pause, rewind or fast-forward, just as they could with a downloaded file.

Media can be streamed from prerecorded files; alternatively, media can also be distributed as part of a live broadcast feed. In a live broadcast, the video signal is converted into a compressed digital signal and then transmitted from a Web server (a type of origin server) that can serve the single file to multiple users at the same time. In typical scenarios, the web server uses unicast to each user. Streaming media can be transmitted by a server application, then received by an endpoint, and displayed at the endpoints in real-time (via any suitable client application (e.g., a media player)). A media player either can be an integral part of a browser, or be provisioned as a plug-in, a separate program, a dedicated device (e.g., an iPod), etc. Frequently, video files are delivered with embedded players such as an embedded Flash player.

A significant objective in many video streaming scenarios is to ensure that the highest possible video quality is provided at each individual endpoint 12a-c. In general terms, the bit rate to be received can be dictated by the client (i.e., the endpoints). As a corollary, it is difficult for a service provider to manage bit rates for subscribers. In the context of adaptive bit rate streaming, in common scenarios, appropriate bit rate selections can be executed by endpoints 12a-c, which simply request appropriate data streams from origin servers 16, 18, 26 directly.

Hence, there can be an implicit one-to-one relationship (similar to unicast) between endpoints 12a-c and origin servers 16, 18, 26, which may be sending the video chunks. To alleviate some of this traffic overhead, cache server 14 can be deployed in the network. Cache server 14 can store the most frequently requested video chunks (e.g., the popular content) at the preferred bit rates. This provisioning can reduce the load for origin servers 16, 18, 26.

From a client perspective, when network conditions allow it, higher rates can be requested. If network conditions deteriorate, then the client can drop down to a lower rate. The specific metric that the endpoints use (in determining whether to move to a higher rate, or to drop down to a lower rate) is typically buffer fullness. For example, if buffers are empty or overflowing, then the rate could be changed. Semantically, when clients see their look-ahead buffer margin being reduced, they can reasonably assume that certain upstream server/network resources are congested and, therefore, the endpoints can attempt to switch to a lower bit rate.

However, in some cases, the lower selected rate does not reduce a load on the congested element; it has the opposite effect and actually increases the load. For example, if the congested element is a cache server, or a link upstream of the cache server, then changing a particular rate may increase the load. In some cases, a particular rate may already be cached in the server, where lower rates may need to be fetched from the origin (or from other upstream servers). In such an instance, when the client reduces the requested rate (in an attempt to decrease the resource utilization in the network), this might actually result in an increased network utilization for cache server 14 and/or network elements upstream.

In accordance with the teachings of the present disclosure, cache server 14 is configured to offer important bit rate hint data to the client, which enables the client to execute intelligent decisions about its bit rate requests. For example, cache server 14 may understand that origin server 18 is under some stress based on a high volume of network traffic. Similarly, cache server 14 can understand its own inherent utilization, where it may already be taxed with a high utilization. If a given endpoint were to request a change in the bit rate (not knowing this information being provided by the rate hint data), then the associated video flows could suffer. For example, if a given endpoint seeks to receive a higher bit rate, it may not be possible to accommodate that bit rate at this juncture because of the stress upstream in the network. Communication system 10 alleviates these issues by providing a mechanism that informs endpoints 12a-c of current network conditions, which can influence bit rate requests.

Before turning to some of the additional operations of communication system 10, a brief discussion is provided about some of the other infrastructure of FIG. 1. Endpoints 12a-c may be used by someone wishing to view streaming video data in communication system 10. The broad term 'endpoint' may be inclusive of devices used to initiate or view data such as a monitor, a television (inclusive of HDTV, plasma screens, flat screens generally, etc.) a console, a proprietary endpoint, a telephone, a mobile phone, a bridge, a computer, a personal digital assistant (PDA), a laptop or electronic notebook, an i-Phone, an iPad, a Google Droid, any other type of smartphone, or any other device, component, element, or object capable of initiating or viewing voice, audio, or data exchanges within communication system 10.

Endpoints 12a-c may also be inclusive of a suitable interface to an end user, such as a microphone, a display, or a keyboard or other terminal equipment. Endpoints 12a-c may also include any device that seeks to initiate a communication on behalf of another entity or element, such as a program, a database, or any other component, device, element, or object capable of initiating a video or a data exchange within communication system 10. Data, as used herein, refers to any type of video, numeric, voice, or script data, or any type of source or object code, or any other suitable information in any appropriate format that may be communicated from one point to another.

Origin servers 16, 18, 26 are network elements that contain video content (e.g., a prerecorded movie, video data sent from cameras covering a live event, video conferencing data, music, media data, voice data, satellite data, image data, surveillance/security data, or any other type of information that may propagate in the network). Origin servers 16, 18, 26 can also simply be gateways, Web servers, pathways, redirection servers, uniform resource locators (URLs), databases, or other data exchanging elements that can assist in servicing client requests.

Cache server 14 can be a dedicated network server, which can serve many origin servers, or other network elements that provide some content sought by endpoints 12a-c. In certain instances, cache server 14 can cache any type of web content (e.g., movies, voice, video conferencing data, HTML pages, media data, audio data, images, etc.), which can help reduce bandwidth usage, server load, and perceived lag in the network. In certain scenarios, cache server 14 is configured to store copies of data passing through it, where subsequent requests may be satisfied from cache server 14 without further burdening the associated origin of the content (i.e., upstream resources).

Billing server 30 can be part of any type of tunneling protocol, any packet data protocol (PDP) authentication, authorization, and accounting (AAA) operations, QoS, RAN signaling, etc. Billing server 30 can offer billing, charging, profile management, QoS management, etc. with per-user rules and per-user service policies. The user profile can define the actions that billing server 30 can take for one or more endpoints 12a-c. In operation, billing server 30 can be configured to identify policies associated with a particular endpoint, such as a certain QoS setting, bandwidth parameter, latency setting, priority, billing, etc.

As described above, origin servers 16, 18, 26, cache server 14, billing server 30 and endpoints 12a-c are coupled via backbone network 22 and/or access network 20. Note that any type of wired and/or wireless links can facilitate these couplings. Backbone network 22 and access network 20 represent a series of points or nodes of interconnected communication paths for receiving and transmitting packets of information that propagate through communication system 10. Backbone network 22 and access network 20 offer a communicative interface between the endpoints and other network elements and each may be any local area network (LAN), Intranet, extranet, wireless local area network (WLAN), metropolitan area network (MAN), wide area network (WAN), virtual private network (VPN), or any other appropriate architecture or system that facilitates communications in a network environment. Backbone network 22 and access network 20 may implement a UDP/IP connection and use a TCP/IP communication protocol in particular embodiments of the present disclosure. However, backbone network 22 and access network 20 may alternatively implement any other suitable communication protocol for transmitting and receiving data packets within communication system 10. Backbone network 22 and access network 20 may foster any communications involving services, content, video, voice, or data more generally, as it is exchanged between end users and various network elements.

Figure 2:
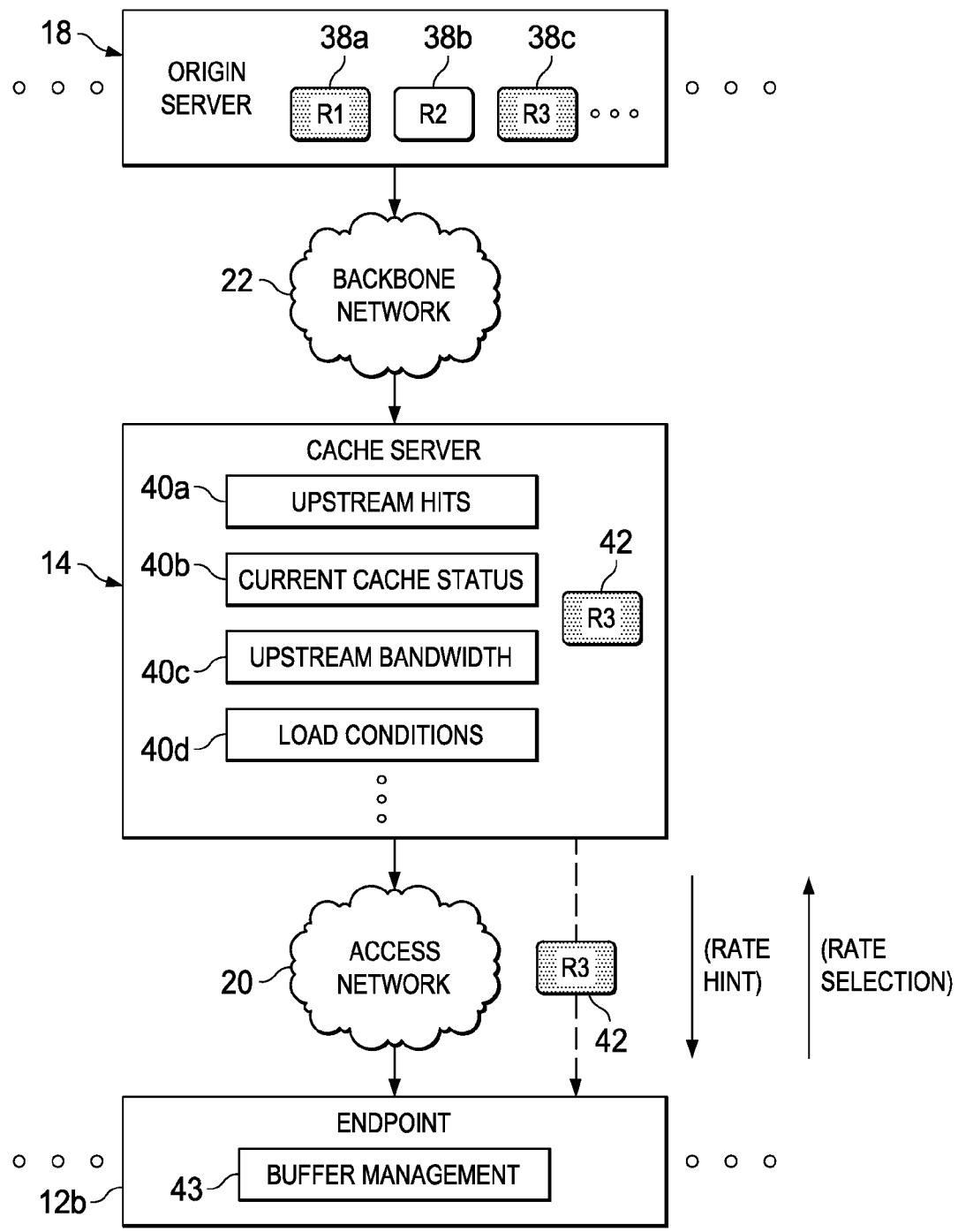
FIGS. 2-3 are simplified block diagrams illustrating example implementation details associated with the communication system.

Turning to FIG. 2, FIG. 2 is a simplified block diagram illustrating additional examples associated with communication system 10 in accordance with one embodiment. FIG. 2 illustrates endpoint 12b including a buffer management element 43. Furthermore, in this embodiment, origin server 18 includes multiple bit rates 38a-c for streaming a given video file. Bit rates 38a-c are labeled as R1, R2, R3 respectively, where Rate1=R1; Rate2=R2; and Rate3=R3. In this implementation, cache server 14 includes a copy of the video file to be streamed to a requesting endpoint. More specifically, cache server 14 includes a bit rate 42 (R3), which may be reflective of popular content sought by endpoints in the network. Additionally, cache server 14 includes a multitude of different criteria that can be evaluated to determine appropriate rate hint data to send to endpoint 12b in this particular example.

The network criteria in this example implementation include upstream hits 40a, current cache status 40b, upstream bandwidth 40c, and load conditions 40d. The upstream hits can include information about particular files or content that is being requested in the network at that time. For example, there could be a large number of hits (i.e., requests) associated with a popular soccer game, or a popular YouTube video. Additionally, the current cache status can be evaluated in order to ascertain utilization (e.g., load, CPU characteristics), the number of requests currently being serviced, the expected future traffic, etc. The upstream bandwidth characteristics can include anything associated with network infrastructure having some bearing on how the video content would be delivered to a given endpoint. For example, there could be time-of-day expectations about bandwidth consumption. Additionally, existing bandwidth characteristics can be evaluated, where these characteristics can be identified (in certain scenarios) by interacting with some type of service provider component in the network. The load conditions can address the current responsibilities of origin server 18, or address any other infrastructure that may influence the delivery of video data.

It is imperative to note that the particular type of network criteria being illustrated within cache server 14 is not exhaustive, as any other suitable criteria can be considered in the context of sending bit rate hints to a given endpoint. For example, other criteria may include general latency characteristics, queuing delay characteristics, quality of service (QoS) characteristics, tunneling protocol characteristics, cost characteristics, additional timing characteristics (e.g., time of day, time of month, time of year, etc.), the presence of backup servers or cache servers that may come online, encoding characteristics, next hop characteristics, or any other suitable characteristics that may influence a bit rate decision and/or the delivery of video data. As used herein in this Specification, the term 'network criteria' includes any of the aforementioned network criteria, or any other network criteria that may influence network conditions, which can affect (directly or indirectly) a bit rate decision. This includes the current conditions and/or capabilities of cache server 14.

In operation, the architecture of FIG. 2 can provide an adaptive streaming architecture that dynamically adjusts its operations based on network characteristic information delivered by cache server 14. This information allows endpoints to make more intelligent rate selection decisions. For example, cache server 14 may store information about the specific rates at which future fragments are currently cached. Furthermore, this stored information would be sent as hints to the client: hints that aid in the selection of appropriate streaming rates, which may already be cached. This would obviate the issue of the endpoints selecting inappropriate rates that require fetching of video data from upstream resources, which may be difficult to accommodate at a particular time.

Moreover, cache server 14 is configured to send appropriate information about current load conditions for cache server 14, along with information related to upstream bandwidth parameters. This information could, for example, allow the client to discern whether currently seen congestion issues are due to the access network (in which case, downshifting rates may help), or whether the congestion is being encountered because of cache server 14 issues, origin server problems, or content network issues (e.g., links that are down). In certain cases, the client may elect to remain at the cached rate, or switch to another rate that is already cached locally, rather than selecting any arbitrary rate from the manifest.

In an operational example, the endpoint can readily establish a data connection with cache server 14. The endpoint can request a given streaming video file. Typically, the bit rate being requested is based on the capabilities of the endpoint (e.g., processor speed, memory, etc.), along with the quality of the connection between cache server 14 and the endpoint.

In this example, endpoint 12*b* requests a high-quality bit rate (i.e., bit rate 38*c* (R3)). When cache server 14 receives this request, it analyzes the current criteria affecting the file transfer. These upstream criteria are generally not visible to endpoint 12*b* without use of the rate hint data. Further, these criteria can be inclusive of any suitable network characteristic that can affect a bit rate decision such as upstream hits (i.e., requests for particular content), current cache status, upstream bandwidth, load conditions, etc. In this particular instance, the bit rate being requested, R3, is already stored locally on cache server 14. Bit rate 42 can be streamed to endpoint 12*b*. Buffer management 43 receives the file, and positions the file in its buffer to be played.

Consider another scenario in which endpoint 12*b* requests a different rate (e.g., a streaming video file at bit rate R2) from cache server 14. Cache server 14 evaluates this request in the context of its internal criteria 40*a-d*. In this instance, cache server 14 identifies the presence of a streaming video file at bit rate R3 being stored at cache server 14. Hence, this rate is available for delivery to the endpoint at a speed higher than requested. Cache server 14 is configured to send rate hint data to endpoint 12*b*. The rate hint data indicates that bit rate R3 is available for video streaming.

Endpoint 12*b* can evaluate the rate hint data and, subsequently, determine if it is capable of accommodating bit rate R3. If endpoint 12*b* can support this streaming video file bit rate, it could elect to receive the file at this juncture. Logistically, the hint rate data can be transferred to the endpoint utilizing various methods. For example, the rate hint data could be included in HTTP headers. Alternatively, the rate hint data could be included in the manifest file. In other examples, the hint data is provided in any appropriate field of a TCP packet. In other instances, a proprietary signaling mechanism can be used to exchange rate hint data between cache server 14 and endpoint 12*b*.

In yet another scenario, endpoint 12*b* can detect minimal network congestion between endpoint 12 and cache server 14, which allows for the highest-quality streaming video file (offered by bit rate R3). In this particular example, cache server 14 has part of the requested high-quality video streaming file stored locally as a copy; however, cache server 14 does not have the entire file. Cache server 14 then is configured to evaluate criteria 40*a-d* in order to send the appropriate rate hint data to endpoint 12*b*. In this example, cache server 14 determines heavy bandwidth usage in backbone network 22 (e.g., between cache server 14 and origin server 18), which inhibits the bit rates that can be reliably provided to endpoint 12*b*. In this instance, only a lower bit rate (representing a lower-quality streaming video file) can be delivered at a consistent speed. Therefore, cache server 14 sends rate hint data to endpoint 12*b* to reflect this condition. The rate hint data indicates that bit rate R1 38*a* is available as a consistent video stream. Endpoint 12*b* can then switch to a lower-quality streaming video file (provided as bit rate R1), and forgo switching to higher-quality streaming video bit rates.

Logistically, cache server 14 is configured to simultaneously evaluate (i.e., access, monitor, determine, assess, etc.) the streaming video sessions (e.g., in real-time) for all endpoints for which it has responsibility. In certain scenarios, the current requests sent by various endpoints can be included in the criteria, which form the basis of the rate hint data. For example, it may be efficient to group several of the endpoints onto the same stream at a designated bit rate. Therefore, a higher quality signal may be available to more endpoints because cache server 14 is not retrieving multiple feeds from a given origin server. This would reduce the traffic and the bandwidth usage between cache server 14 and the associated origin server.

The flow of rate hint data between cache server 14 and endpoint 12b can be a continuous process. Due to the inherent nature of the network, the criteria being evaluated by cache server 14 would also change such that additional rate hint data would be sent to the endpoints. This systematic interaction enables cache server 14 to limit video quality issues: some of which may not be present at the outset of a streaming video transfer, but which may have surfaced during the streaming of video content.

Figure 3:
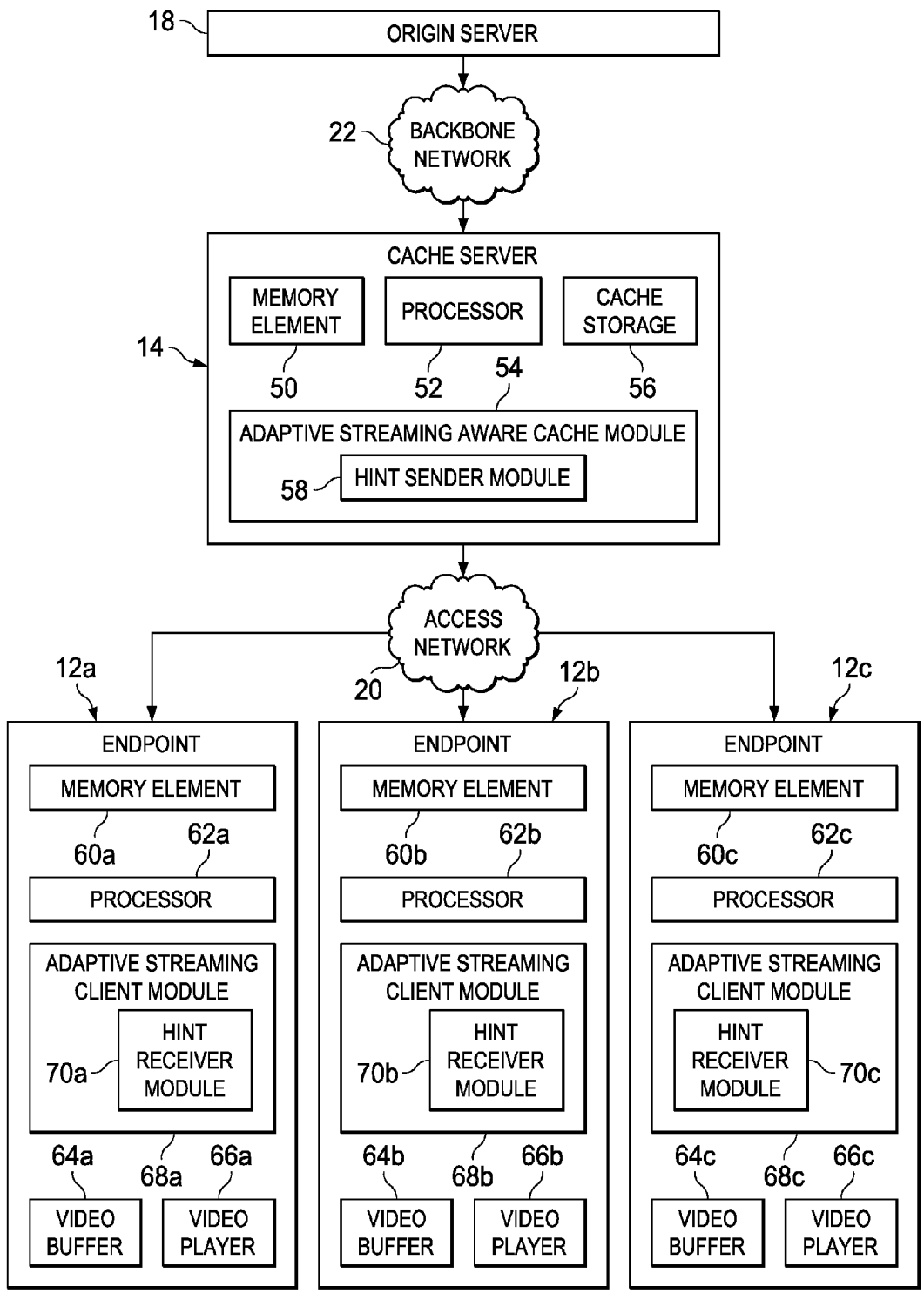

Referring now to FIG. 3, FIG. 3 is a simplified block diagram illustrating a network arrangement depicting additional details associated with endpoints 12a-c and cache server 14. Cache server 14 includes a memory element 50, a processor 52, a cache storage 56, and an adaptive streaming aware cache module 54, which includes a hint sender module 58. Additionally, each endpoint 12a-c includes a respective memory element 60a-c, a processor 62a-c, a video buffer 64a-c, a video player 66a-c, and an adaptive streaming client module 68a-c, which includes a respective hint receiver module 70a-c.

In operation, adaptive streaming aware cache module 54 is configured to monitor the network criteria throughout the adaptive streaming operations. As changes in the criteria occur, new rate hint data can be sent to a particular endpoint. Hint sender module 58 can systematically send the rate hint data to endpoints 12a-c at any appropriate time (e.g., at prescribed intervals, when network conditions change in a significant manner, in response to a request from a given point, or at any other appropriate time). The rate hint data can be received by a respective hint receiver module 70a-c of a given endpoint. This information can be evaluated, for example, by adaptive streaming client modules 68a-c. Adaptive streaming client modules 68a-c can be configured to determine when new rate selections should occur, where bit rate selections can be properly sent to cache server 14.

In this way, cache server 14 can continue to receive requests from any given endpoint, and respond to these requests by providing appropriate rate hint data to assist the endpoints in making their determination about a selection of an appropriate bit rate. Cache server 14 can readily access files stored in cache storage 56, where such information may have been retrieved from any suitable source (e.g., origin server 18, a URL, a Web server, a video feed, etc.).

In one particular instance, cache server 14 is a network element configured to exchange data in a network environment such that the adaptive bit rate streaming management functions discussed herein is achieved. As used herein in this Specification, the term 'network element' is meant to encompass various types of routers, switches, gateways, bridges, loadbalancers, firewalls, servers, inline service nodes, proxies, processors, modules, or any other suitable device, network appliance, component, proprietary element, or object operable to exchange information in a network environment. The network element may include appropriate processors, memory elements, hardware and/or software to support (or otherwise execute) the activities associated with adaptive bit rate streaming management, as outlined herein. Moreover, the network element may include any suitable components, modules, interfaces, or objects that facilitate the operations thereof. This may be inclusive of appropriate algorithms and communication protocols that allow for the effective exchange of data or information.

In a specific implementation, adaptive streaming aware cache module 54, hint sender module 58, adaptive steaming client modules 68a-c and/or hint receiver modules 70a-c are provisioned as software to achieve (or to foster) the adaptive bit rate streaming management operations, as outlined herein in this document. In one example, adaptive streaming aware cache module 54 can have an internal structure (e.g., a processor, a memory element, etc.) to facilitate the operations described herein. In other embodiments, all of these adaptive bit rate streaming management features may be provided externally to these elements, or included in some other network element to achieve this intended functionality. Alternatively, any other network element can include this software (or reciprocating software) that can coordinate the adaptive streaming activities discussed herein. In other instances, a proprietary element (which may be separate from cache server 14) can be leveraged to readily achieve the teachings of the present disclosure in evaluating criteria in order to send rate hint data.

Figure 4:
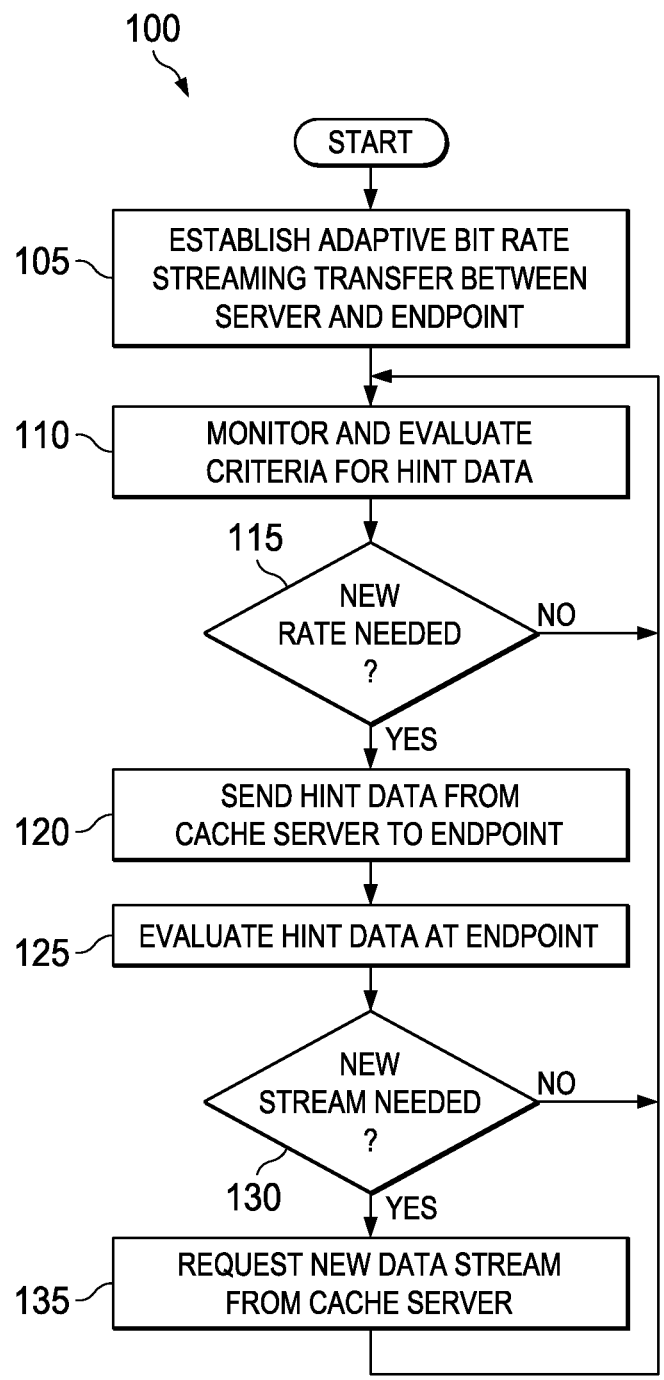
FIG. 4 is a simplified flowchart illustrating example operations associated with one embodiment of the communication system.

FIG. 4 is a simplified flowchart 100 illustrating one potential operation associated with an embodiment of communication system 10 during an adaptive bit rate streaming scenario. Initially, the video session may be established between a given endpoint and cache server 14. Once established, a streaming video transfer can occur between these two elements, as illustrated at 105. At 110, cache server 14 evaluates various network conditions (e.g., criteria such as upstream hit information, current cache status information, upstream bandwidth information, load conditions, etc.) that can be used to form rate hint data for the endpoints.

At 115, a decision is made whether a new rate would be beneficial for this particular endpoint. For example, the endpoint (using its internal resources) may determine that a higher bit rate is warranted at this juncture. If a new rate is not appropriate, the video session continues to be monitored. When a new bit rate is initiated, rate hint data can be sent from cache server 14 to the particular endpoint at 120. The endpoint can suitably receive the rate hint data (at 125), and evaluate the rate hint data in the context of its own capabilities/resources. It should also be noted that in some embodiments, the client does not actually request hints and, instead, the server continuously pushes the hint data to clients. Stated in different terminology, the server can send hint data without a decision from the client to switch a given rate.

At 130, a determination is made whether a new stream should be communicated to the endpoint. If for whatever reason, changing the bit rate were not feasible at this time, then the endpoint would continue receiving its existing video stream. However, if the rate hint data (provided by cache server 14) suggested to the endpoint that a different bit rate can be accommodated (by both cache server 14 and by the particular endpoint), then a new bit rate request can be sent to cache server 14. The new bit rate would be reliably supported by cache server 14, as previously determined by suitably monitoring the appropriate criteria.

Note that in certain example implementations, the adaptive bit rate streaming management functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 3] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 3] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Hence, any of the devices illustrated in the preceding FIGURES may include a processor that can execute software or an algorithm to perform the adaptive bit rate streaming management activities, as discussed in this Specification. Furthermore, endpoints 12a-c and/or cache server 14 can include memory elements for storing information to be used in achieving the adaptive bit rate streaming management operations, as outlined herein. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, table, key, etc.) should be construed as being encompassed within the broad term 'memory element.' Similarly, any of the potential processing elements, modules, and machines described in this Specification should be construed as being encompassed within the broad term 'processor.'

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures. Additionally, although described with reference to particular scenarios, where a particular module, such as adaptive streaming aware cache module 54, which includes a hint sender module 58, is provided within a network element, these modules can be provided externally, or consolidated and/or combined in any suitable fashion. In certain instances, such modules may be provided in a single proprietary unit.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings provided herein.

In certain example scenarios, the capabilities of cache server 14 are available via multicast at the network egress edge. Additionally, the adaptive bit rate features discussed herein can readily be extended to include modifying the manifest file to indicate which resolutions are locally cached, as well as which resolutions are available via multicast.

It is also imperative to note that the activities associated with adaptive bit rate determinations can integrate any number of criteria, as identified herein. For example, in a baseline algorithm being used by cache server 14, the rate hint data can depend on the internal characteristics of cache server 14 with no explicit feedback from the core network. In another example, cache server 14 can evaluate additional network characteristics. In another instance, cache server 14 can include explicit congestion notification (ECN) feedback being incorporated into the hint rate data. In still other examples, cache server 14 can include embedding any portion of the criteria into broadband cable applications (e.g., Cable Modem Termination Systems (CMTS), cable modems, cable security, cable video, Data-over-Cable Service Interface Specifications (DOCSIS), etc.), where suitable hint rate data is being provided for the architecture. Moreover, cache server 14 can be provisioned in a 3GPP mobility streaming adaptive bit rate (ABR) paradigm in order to more reliably deliver video data.

In other instances, the features of cache server 14 can be applied to a Real-time Transport Protocol (RTP)/Real-Time Transport Control Protocol (RTCP) method that utilizes RTCP feedback and network feedback to enable the stream source to decide which variant of the stream to originate on the network path. Any such possibilities are clearly within the broad scope of the present disclosure, where permutations and hybrids of any of the aforementioned criteria can readily be adopted by a video architecture.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. It is also imperative to note that communication system 10 can be used in any type of video applications. This can include standard video rate transmissions, ABR, VBR, CBR, or any other video technology in which bit rates can be intelligently selected. Communication system 10 can readily be used in any such video environments, as the teachings of the present disclosure are equally applicable to all such alternatives and permutations.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
  establishing a video session involving an endpoint and a cache server;
  evaluating network criteria associated with characteristics that can affect a bit rate for the video session, wherein the network criteria includes at least one upstream network characteristic between the cache server and an origin server providing content for the video session;

communicating bit rate hint data, which is based on the network criteria, from the cache server to the endpoint for consideration in a bit rate request, wherein the bit rate request involves streaming data in the video session, and wherein the bit rate hint data indicates that a particular bit rate is available for streaming to the endpoint; and receiving the bit rate request from the endpoint.

2. The method of claim 1, wherein the network criteria is selected from a group of criteria, the group consisting of:
   a) a number of requests for particular content upstream of the cache server;
   b) a utilization characteristic associated with the cache server;
   c) a bandwidth characteristic associated with network infrastructure upstream of the cache server; and
   d) load conditions associated with the origin server that provides content for the video session.

3. The method of claim 1, wherein the bit rate hint data is provided in headers of hypertext transfer protocol (HTTP) packets.

4. The method of claim 1, wherein the bit rate hint data is provided in a manifest associated with the video session.

5. The method of claim 1, wherein additional bit rate hint data is sent to the endpoint in order to update network criteria to be considered in changing an existing bit rate for the video session.

6. The method of claim 1, wherein the cache server provides a bit rate that is higher than a particular bit rate specified in the bit rate request based on the evaluation of the network criteria.

7. Logic encoded in non-transitory media that includes code for execution and when executed by a processor operable to perform operations comprising:
   establishing a video session involving an endpoint and a cache server;
   evaluating network criteria associated with characteristics that can affect a bit rate for the video session, wherein the network criteria includes at least one upstream network characteristic between the cache server and an origin server providing content for the video session;
   communicating bit rate hint data, which is based on the network criteria, from the cache server to the endpoint for consideration in a bit rate request, wherein the bit rate request involves streaming data in the video session, and wherein the bit rate hint data indicates that a particular bit rate is available for streaming to the endpoint; and
   receiving the bit rate request from the endpoint.

8. The logic of claim 7, wherein the bit rate hint data is provided in headers of hypertext transfer protocol (HTTP) packets.

9. The logic of claim 7, wherein the bit rate hint data is provided in a manifest associated with the video session.

10. The logic of claim 7, wherein additional bit rate hint data is sent to the endpoint in order to update network criteria to be considered in changing an existing bit rate for the video session.

11. The logic of claim 7, wherein the cache server provides a bit rate that is higher than a particular bit rate specified in the bit rate request based on the evaluation of the network criteria.

12. An apparatus, comprising:
   a memory element configured to store electronic code;
   a processor operable to execute instructions associated with the electronic code; and
   a rate module configured to interface with the processor such that the apparatus is configured for:
      establishing a video session involving an endpoint and a cache server;
      evaluating network criteria associated with characteristics that can affect a bit rate for the video session, wherein the network criteria includes at least one upstream network characteristic between the cache server and an origin server providing content for the video session;
      communicating bit rate hint data, which is based on the network criteria, from the cache server to the endpoint for consideration in a bit rate request, wherein the bit rate request involves streaming data in the video session, and wherein the bit rate hint data indicates that a particular bit rate is available for streaming to the endpoint; and
      receiving the bit rate request from the endpoint.

13. The apparatus of claim 12, wherein the network criteria is selected from a group of criteria, the group consisting of:
   a) a number of requests for particular content upstream of the cache server;
   b) a utilization characteristic associated with the cache server;
   c) a bandwidth characteristic associated with network infrastructure upstream of the cache server; and
   d) load conditions associated with the origin server that provides content for the video session.

14. The apparatus of claim 12, wherein the bit rate hint data is provided in headers of hypertext transfer protocol (HTTP) packets.

15. The apparatus of claim 12, wherein the bit rate hint data is provided in a manifest associated with the video session.

16. The apparatus of claim 12, wherein additional bit rate hint data is sent to the endpoint in order to update network criteria to be considered in changing an existing bit rate for the video session.

17. The apparatus of claim 12, wherein the cache server provides a bit rate that is higher than a particular bit rate specified in the bit rate request based on the evaluation of the network criteria.

18. A method, comprising:
   establishing a video session with a cache server;
   receiving bit rate hint data, which is based on network criteria associated with characteristics that can affect a bit rate for the video session, wherein the bit rate hint data indicates that a particular bit rate is available for streaming to an endpoint, and wherein the network criteria includes at least one upstream network characteristic between the cache server and an origin server providing content for the video session; and
   communicating a bit rate request from the endpoint to the cache server, wherein the bit rate request involves streaming data in the video session, and the bit rate request is based, at least in part, on the bit rate hint data.

19. The method of claim 18, wherein the network criteria is selected from a group of criteria, the group consisting of:
   a) a number of requests for particular content upstream of the cache server;
   b) a utilization characteristic associated with the cache server;
   c) a bandwidth characteristic associated with network infrastructure upstream of the cache server; and
   d) load conditions associated with the origin server that provides content for the video session.

20. The method of claim 18, wherein the bit rate hint data is provided in headers of hypertext transfer protocol (HTTP) packets.

21. The method of claim 18, wherein the bit rate hint data is provided in a manifest associated with the video session.

22. The method of claim 18, wherein additional bit rate hint data is received in order to update network criteria to be considered in changing an existing bit rate for the video session.

23. The method of claim 18, wherein the server provides a bit rate that is higher than a particular bit rate specified in the bit rate request.

* * * * *